Figure 1:
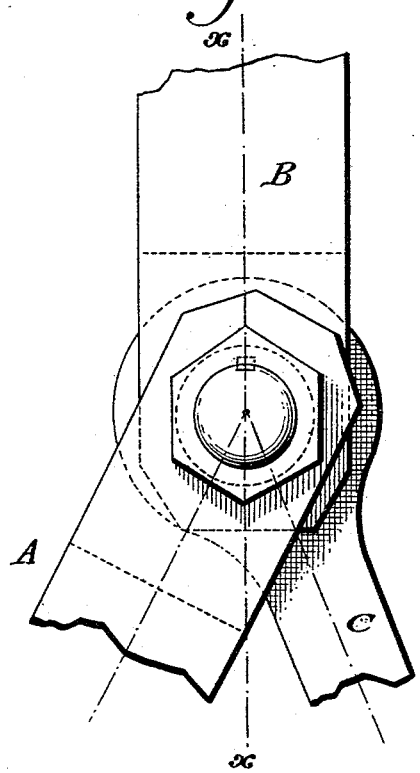

(No Model.)

C. STEINER.
JOINT FOR TRUSSES.

No. 458,199. Patented Aug. 25, 1891.

WITNESSES:
F. Norman Dixon
Frank Quinn

Charles Steiner
INVENTOR

BY Wm. C. Strawbridge
J. Bonsall Taylor
ATTORNEYS.

UNITED STATES PATENT OFFICE.

CHARLES STEINER, OF PHŒNIXVILLE, PENNSYLVANIA.

JOINT FOR TRUSSES.

SPECIFICATION forming part of Letters Patent No. 458,199, dated August 25, 1891.

Application filed February 2, 1891. Serial No. 379,929. (No model.)

*To all whom it may concern:*

Be it known that I, CHARLES STEINER, a citizen of the Republic of Switzerland, residing at Phœnixville, Pennsylvania, have invented certain new and useful Improvements in Joints for Struts, Trusses, and Similar Articles, of which the following is a specification.

It is desirable to unite trusses or struts, employed in bridges and structures of various kinds, in such manner that while firmly held together they shall nevertheless be permitted to have a slight movement with reference to each other so as to adjust themselves somewhat to varying strains. Heretofore, therefore, it has been customary to unite the meeting ends of such members lying in the same plane, or in parallel planes, by means of a bolt passing, at the point of intersection of the longitudinal axes of the members, through both or all in a direction perpendicular to said plane, and said members had a slight movement in said plane upon said bolt as an axis. This union, however, is not fitted to unite members lying in planes inclined to each other, and when bridge struts or members so disposed are to be joined it is necessary to add to said bolt, extensions which are perpendicular to the respective members.

It is the object of my invention to provide a simple durable and inexpensive means whereby the meeting ends of a number of members such as struts, lying in planes inclined to each other, may be united firmly any compactly and so that their respective axes all intersect at a given point, but which struts are nevertheless left free for slight adjustment or movement.

In the drawings I show and herein I describe, a preferred form of a convenient embodiment of my invention, the particular subject-matter claimed as novel being hereinafter definitely specified.

Figure 2:
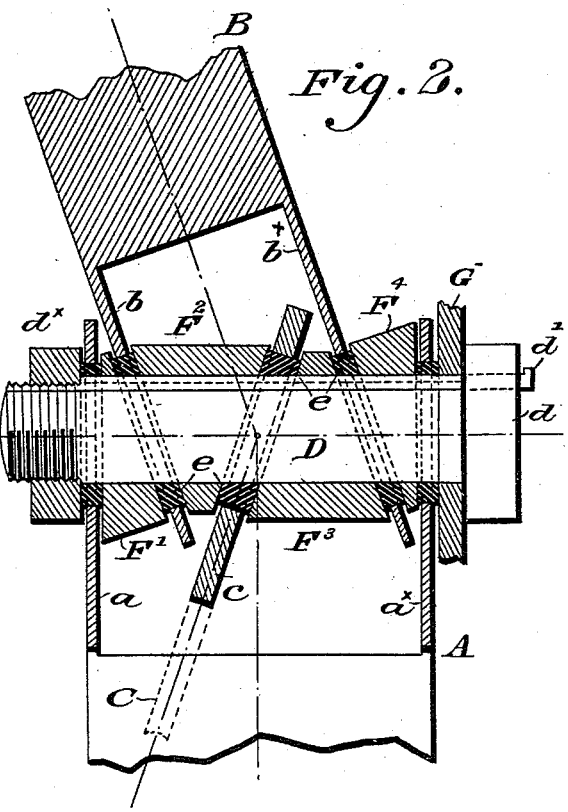
Figure 3:
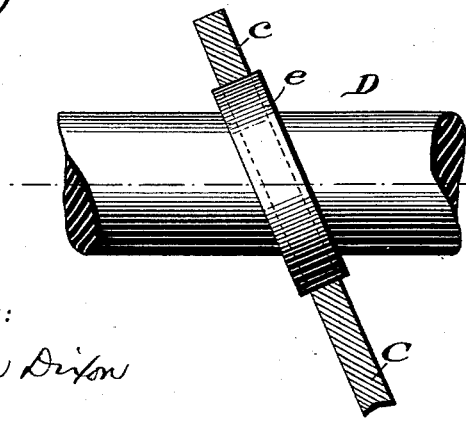

In the drawings, Figure 1 is a view in side elevation of the extremital portions of bridge members lying in different planes and united by a joint embodying my invention. Fig. 2 is a longitudinal central vertical sectional elevation of the same taken on the line $x\ x$ of Fig. 1. Fig. 3 is a detail view of a portion of the bolt and of the bar lug, illustrating the employment in connection therewith of a bolt hole washer.

Similar letters of reference indicate corresponding parts.

In the drawings A and B are struts trusses or kindred members, and C is a tie bar, the meeting or contiguous extremities of all of which are united. The lugs $a\ a^x$ constituting the extremital portion of the strut A each embody a bolt hole, which holes are axial with respect to each other, their common axis happening to be perpendicular to that of said strut.

The strut B is inclined with respect to the strut A, and the lugs $b\ b^x$, which are of different lengths, constituting its extremital portion lie between the lugs $a\ a^x$ and similarly each embody a bolt hole, which bolt holes are so disposed that when said strut is in place, in the assemblage of the members A B and C, they coincide in alignment with the bolt holes of said lugs $a\ a^x$.

The tie bar C lies in a plane inclined in a direction opposite to that of the strut B, and the single lug $c$ in which said bar terminates lies between the lugs $b\ b^x$ described. Said lug $c$ embodies a bolt hole, which is so disposed that when said bar is in place in the assemblage of the members A B and C it coincides in alignment with the bolt holes of the other lugs.

D is a pin or bolt equipped with a head $d$ and a nut $d^x$, and designed to pass through the described bolt holes of the assembled members to bind the latter together, and to serve as the foundation or base for the bolt hole washers and the skew washers, whereof hereinafter.

The bolt holes formed in the respective ends of the members are axially perpendicular to the planes of said respective members, and therefore, in the case of inclined members such as B and C in the joint shown in the drawings oblique with reference to the bolt, and are, to permit the insertion in each of said holes of a bolt washer $e$, of greater diameter than the bolt D. Each bolt hole washer embodies a central aperture the inner face or edge of which snugly fits the exterior of the bolt, all of the inner faces or edges existing in a common cylindric or other plane,—while the outer edge of each washer snugly fits the interior of the bolt hole in which it is placed, said edge being right angular with respect to its own side faces.

F' F² F³ F⁴ are a series of blocks which I term skew washers, being shown as wedge shaped or of greater breadth at one side than at the other and being each centrally apertured to receive the bolt D. Said skew washers are respectively disposed between the various lugs through which the bolt passes,—the skew washer F' being between the lugs $a$ and $b$,—the washer F² being between the lugs $b$ and $c$,—the washer F³ between the lugs $c$ and $b^\times$, and the washer F⁴ between the lugs $b^\times$ and $a^\times$. The end faces of the washers are preferably shaped to correspond to the respective lugs or washers between which they are respectively placed whatever the inclinations or shapes of such lugs may be.

In the assemblage of the parts the ends of the members are brought into position, the washers placed within the bolt holes of the lugs, and the bolt threaded through said bolt holes and through appropriately shaped intervening skew washers. By the screwing up of the nut the skew washers and bolt hole washers are held solidly together. If the bolt is of circular cross section a key $d'$ is employed to prevent movement of the washers before the nut tightens them together.

As will be obvious, each truss or member is free for slight axial movement upon its bolt-hole washer, each bolt-hole washer constituting for the member in which it is mounted a pivot or axis perpendicular to the axis of said member, and said bolt-hole washers, therefore in connection with a bolt, form in a single compact structure, a series of independent seats facing respectively in as many directions as may be desired to accommodate the different members joined,—which bolt hole washers are held in position by the skew washers which fill up the space on the bolt not occupied by them. The bolt hole washers, being somewhat thicker than the lugs in which they are mounted, receive the pressure of the skew washers in the tightening up of the nut, so that no matter how tightly said nut may be screwed, said lugs are left free for their contemplated movement of adjustment.

G is a hanger bar to support which the bolt D happens to be utilized.

Having thus described my invention, I claim:

1. In combination with a plurality of struts or kindred devices, a bolt, a series of skew washers, and a series of bolt hole washers, substantially as set forth.

2. As a means for uniting the contiguous ends of two or more struts or kindred members inclined with reference to each other and embodying bolt holes perpendicular to their axes, a series of bolt hole washers mounted and fitted in said respective bolt holes and each embodying a central aperture which when the strut ends are assembled are in registry with each other, a bolt passing through the bolt apertures, and skew washers interposed between the respective ends of the struts, substantially as set forth.

In testimony that I claim the foregoing as my invention I have hereunto signed my name this 10th day of January, A. D. 1891.

CHARLES STEINER.

In presence of—
F. NORMAN DIXON,
FRANK QUINN.